(12) United States Patent (10) Patent No.: US 9,092,122 B2
Husoy et al. (45) Date of Patent: Jul. 28, 2015

(54) METHOD AND SYSTEM FOR GENERATING A CONTROL SYSTEM USER INTERFACE

(71) Applicant: ABB RESEARCH LTD., Zürich (CH)

(72) Inventors: Kristoffer Husoy, Oslo (NO); Tone-Grete Graven, Oslo (NO); Torgeir Enkerud, Oslo (NO)

(73) Assignee: ABB RESEARCH LTD., Zürich (CH)

( * ) Notice: Subject to any disclaimer, the term of this patent is extended or adjusted under 35 U.S.C. 154(b) by 358 days.

(21) Appl. No.: 13/721,457

(22) Filed: Dec. 20, 2012

(65) Prior Publication Data
US 2013/0212516 A1 Aug. 15, 2013

Related U.S. Application Data

(63) Continuation of application No. 12/528,992, filed as application No. PCT/EP2008/051713 on Feb. 13, 2008, now Pat. No. 8,356,257.

(30) Foreign Application Priority Data

Feb. 27, 2007 (EP) .................................... 07103132

(51) Int. Cl.
*G06F 3/048* (2013.01)
*G06F 3/0484* (2013.01)
(Continued)

(52) U.S. Cl.
CPC ............ *G06F 3/0484* (2013.01); *G06F 9/4443* (2013.01); *G06F 3/0481* (2013.01)

(58) Field of Classification Search
CPC .................................................. G06F 3/0481

USPC .......................................... 715/777, 771, 738
See application file for complete search history.

(56) References Cited

U.S. PATENT DOCUMENTS 5,509,116 A 4/1996 Hiraga et al.
6,002,398 A 12/1999 Wilson
(Continued)

FOREIGN PATENT DOCUMENTS

EP 660219 A2 6/1995
EP 1283484 A2 2/2003
(Continued)

OTHER PUBLICATIONS

PCT/ISA/210—International Search Report—Jul. 16, 2008.
(Continued)

*Primary Examiner* — William Titcomb
(74) *Attorney, Agent, or Firm* — Venable LLP; Eric J. Franklin

(57) ABSTRACT

A graphical user interface for an industrial control system including a computer. The graphical user interface includes a display device. A plurality of process graphics including at least one software object for controlling and/or monitoring real world objects controlled by the control system are arranged such that elements of at least a portion of at least one software object may be displayed on the interface displayed on the display device. Computer program instructions generate and display in the graphical user interface a main view including a first process graphic in a window. The first process graphic is a member of a predetermined group of process graphics. The main view includes a designated view including at least one tab directly linked to other members of the predetermined group. Selecting one of the tabs allows the user to navigate to one of the predetermined group of process graphics.

19 Claims, 9 Drawing Sheets

(51) Int. Cl.
*G06F 9/44* (2006.01)
*G06F 3/0481* (2013.01)

(56) References Cited

U.S. PATENT DOCUMENTS

| | | |
|---|---|---|
| 6,542,796 B1 | 4/2003 | Gibbs et al. |
| 7,165,221 B2 * | 1/2007 | Monteleone et al. ......... 715/738 |
| 8,356,257 B2 * | 1/2013 | Husoy et al. ................. 715/777 |
| 2002/0046290 A1 | 4/2002 | Andersson et al. |
| 2004/0085367 A1 | 5/2004 | Hagarty, Jr. |
| 2006/0230356 A1 | 10/2006 | Sauve et al. |
| 2007/0179641 A1 | 8/2007 | Lucas et al. |
| 2008/0066004 A1 * | 3/2008 | Blevins et al. ................ 715/771 |

FOREIGN PATENT DOCUMENTS

| | | |
|---|---|---|
| EP | 1376323 A1 | 1/2004 |
| WO | WO-01/02953 A1 | 1/2001 |
| WO | WO-01/15014 A2 | 3/2001 |
| WO | WO-2006/096792 A2 | 9/2006 |
| WO | WO-2006/103541 A1 | 10/2006 |

OTHER PUBLICATIONS

PCT/ISA/237—Written Opinion of the International Search Authority—Jul. 16, 2008.

* cited by examiner

US 9,092,122 B2

METHOD AND SYSTEM FOR GENERATING A CONTROL SYSTEM USER INTERFACE

CROSS-REFERENCE TO RELATED APPLICATIONS

This application is a continuation of co-pending application Ser. No. 12/528,992 filed Aug. 27, 2009, which was the national phase under 35 U.S.C. §371 of PCT/EP2008/051713 filed 13 Feb. 2008, and claims priority to European patent application 07103132.2 filed 27 Feb. 2007.

TECHNICAL FIELD

The invention concerns method and system for automatically providing improved navigation means in a user interface in an industrial control system. In particular the invention provides improved navigation to a graphic user interface for monitoring or controlling a part of an industrial control system.

TECHNICAL BACKGROUND

In the supervisory control of industrial plants there is continual and generally increasing requirement for information about plant equipment, current and historic process data, trends, etc. This information is typically provided by the control system and usually in the form of one or more distributed control systems (DCS) and/or supervisory control and data acquisition (SCADA) systems. With the increases in computing power and advances in communication and computerized measurement there is an increasing amount of data available for the operators.

The information is often presented to the operators through a display screen showing process graphics that presents process data (measurements, values), tag identifiers, equipment ID, alarm status, connections between plant equipment, etc. As more and more data is presented to the operators, the visual user interfaces each often hold very much information.

The task of finding the relevant technical information for a given technical subject or condition in a large information space is further complicated by the fact that in many situations the operator often has limited time available to make a decision. The significance of the information available will vary with the current situation. That is, users of industrial control systems have to deal at least in part with a context sensitivity problem, as in some contexts certain information will be essential and in others irrelevant.

U.S. Pat. No. 6,542,796 entitled Methods and apparatus for integrating, organizing, and accessing flight planning and other data on multifunction cockpit displays, to Gibbs, assigned to Honeywell International Inc. describes methods for integrating, organizing, and accessing flight planning and other data on cockpit displays in aircraft. Different parts of a flight plan and/or information about different functions may be displayed in a series of windows each accessed by a selecting a known graphic display feature in computer systems called a tab.

In U.S. Pat. No. 6,002,398 entitled Navigation between property pages with tabs and menus, assigned to Novell, Inc., a method is described for displaying a tabbed dialog box, a property sheet, which has at least one child window. The parent window or property sheet has a multiple associated, displayable child windows. However at run time the described program loads all of the objects, including graphics, for all the child windows after user initiates the action which represents a heavy load on processor, display and system resources at runtime.

WO01/02953 describes a method for integration of many and various types of applications in a computerized system. This method is based on a concept where real world objects are represented as composite. Different facets of a real world object, such as its physical location, the current stage in a process, a control function, an operator interaction etc., are described as different aspects of the composite object. In this application, composite objects as defined by WO01/02953 are referred to as aspect objects.

A feature of the method described in WO01/02953 is that aspect objects can be organized in structures. A structure of aspect objects is a hierarchy of object instances. It may be based on any type of relations between aspect object instances. An aspect object can be placed in several structures at the same time, where the different structures represent different relations, e.g. functional and physical containment (functional structure and location structure).

A further application of the method of WO01/02953 is described in US-2002-0046290-A1. A meta-object representing an entity is typically represented in several hierarchical structures at the same time within a control system. For example, a certain piece of process equipment has a certain position in a functional structure depending on the functional breakdown of the plant. It has also a physical position, and thus it has a place in a location structure. The same piece of equipment may currently be allocated to a certain production order, so it belongs to an order structure. Because it is used to produce a certain product, it also fits in a product structure.

Finding the right information in control systems is often difficult because the information space is so large. There are often 10s of thousands of individual tag names and hundreds or thousands of process graphics, so that the task of navigation between control interfaces for different parts of processes is often difficult or time consuming. The most common navigation method is to have links arranged with or around the process graphics. The navigation methods are otherwise limited to back/forward and history, context menu, display shortcut buttons and the like. Although different navigation schemes have been proposed they often demand considerable additional engineering or considerable system resources, or both.

SUMMARY OF THE INVENTION

According to an aspect of the present invention an improvement is provided in the form of a method for providing an operational interface for an industrial control system wherein a designated view provides tabs for navigation between process graphics. The tabs are however used differently than what is common from other domains, as they represent some of the navigational opportunities available to the user, in stead of providing access to already open documents.

According to an embodiment of the present invention an improvement is provided in the form of a method for providing a user interface with improved navigation features for an industrial control system comprising a computer and a display device said system further comprising software objects for controlling and/or monitoring real world objects controlled by said control system, said system being further arranged with a plurality of process graphics comprising one or more said software objects, wherein said method further includes displaying on said user interface a main view comprising a first said process graphic in a window arranged with a designated view, the designated view being arranged with one or more tabs, and generating a designated view for a group of process graphics in which said designated view each tab is linked with a process graphic that is a member of said group, and providing the designated view with one or more tabs with a direct link to other members of the said group of process graphics, and directly displaying, upon selection of one of the one or more tabs, another process graphic so selected from the said group in said industrial control system.

According to an embodiment of the present invention an improvement is provided in the form of a method for providing a user interface for an industrial control system comprising software objects for controlling and/or monitoring real world objects controlled by said control system, said system being arranged with a plurality of process graphics comprising one or more said software objects, which said method further includes displaying a main view comprising a first said process graphic in a window arranged with a designated view, the designated view being arranged with one or more tabs, wherein said method further comprises automatically generating a link to each process graphic in the said process graphic group dependent on sharing a common process context.

According to an embodiment of the present invention an improvement is provided in the form of a method for providing a user interface for an industrial control system comprising software objects for controlling and/or monitoring real world objects controlled by said control system, said system being arranged with a plurality of process graphics comprising one or more said software objects, which said method further includes displaying a main view comprising a first said process graphic in a window arranged with a designated view, the designated view being arranged with one or more tabs, wherein said method further comprises automatically generating a link between a first software object in a first process graphic and a designated view of another process graphic containing a second software object linked to the first software object, such that, the process graphic in a designated view arranged with tabs linked to other process graphics are each members of the said group of process graphics selected sharing a logical grouping or common process context.

According to an embodiment of the present invention an improvement is provided in the form of a method for providing a user interface with improved navigation features for an industrial control system comprising software objects for controlling and/or monitoring real world objects controlled by said control system, said system being arranged with a plurality of process graphics comprising one or more said software objects, which said method further includes displaying a main view comprising a first said process graphic in a window arranged with a designated view, the designated view being arranged with one or more tabs, wherein said method further comprises linking by means of a designated view the first software object in a first process graphic to a second software object in a second process graphic dependent on a predetermined logical grouping or common process context of a structure of aspect objects.

According to an embodiment of the present invention an improvement is provided in the form of a method for providing an improved user interface for an industrial control system comprising software objects for controlling and/or monitoring real world objects controlled by said control system, said system being arranged with a plurality of process graphics comprising one or more said software objects, which said method further includes displaying a main view comprising a first said process graphic in a window arranged with a designated view, the designated view being arranged with one or more tabs, wherein said method further comprises linking by means of a designated view the first software object in a first process graphic to a second software object in a second process graphic dependent on a predetermined logical grouping or common process context of a structure of aspect objects for monitoring and/or control of a process section.

According to an embodiment of the present invention an improvement is provided in the form of a method for providing a user interface with improved navigation features for an industrial control system comprising software objects for controlling and/or monitoring real world objects controlled by said control system, said system being arranged with a plurality of process graphics comprising one or more said software objects, which said method further includes displaying a main view comprising a first said process graphic in a window arranged with a designated view, the designated view being arranged with one or more tabs, wherein said method further comprises linking by means of a designated view the first software object in a first process graphic to a second software object in a second process graphic dependent on a preconfigured selection of a structure of aspect objects for monitoring and/or control of equipment.

According to an embodiment of the present invention an improvement is provided in the form of a method for providing a user interface with improved navigation features for an industrial control system comprising software objects for controlling and/or monitoring real world objects controlled by said control system, said system being arranged with a plurality of process graphics comprising one or more said software objects, which said method further includes displaying a main view comprising a first said process graphic in a window arranged with a designated view, the designated view being arranged with one or more tabs, wherein said method further comprises linking by means of a designated view the first software object in a first process graphic to a second software object in a second process graphic dependent on a preconfigured selection of a structure of aspect objects for monitoring and/or control of a location in a plant. In a further development the preconfigured selection of a structure of aspect objects may be configured by means of a default setting. In another development the preconfigured selection of a structure of aspect objects may be configured by means of a a manually operated selection.

According to an embodiment of the present invention an improvement is provided in the form of a method for providing a user interface with improved navigation features for an industrial control system comprising software objects for controlling and/or monitoring real world objects controlled by said control system, said system being arranged with a plurality of process graphics comprising one or more said software objects, which said method further includes displaying a main view comprising a first said process graphic in a window arranged with a designated view, the designated view being arranged with one or more tabs, wherein said method further comprises linking by means of a designated view the first process graphic to a second process graphic dependent in part on a current or historic series of steps navigated between process graphics.

According to an embodiment of the present invention an improvement is provided in the form of a method for providing a user interface with improved navigation features for an industrial control system comprising software objects for controlling and/or monitoring real world objects controlled by said control system, said system being arranged with a plurality of process graphics comprising one or more said software objects, which said method further includes displaying a main view comprising a first said process graphic in a window arranged with a designated view, the designated view being arranged with one or more tabs, wherein said method further comprises linking by means of a designated view the first process graphic to a second process graphic dependent in part on a software object being present in both process graphics.

According to an embodiment of the present invention an improvement is provided in the form of a method for providing a user interface with improved navigation features for an industrial control system comprising software objects for controlling and/or monitoring real world objects controlled by said control system, said system being arranged with a plurality of process graphics comprising one or more said software objects, which said method further includes displaying a main view comprising a first said process graphic in a window arranged with a designated view, the designated view being arranged with one or more tabs, wherein said method further comprises maintaining a given designated view arranged with a tab which tab is visible at all times on an operator display.

According to an embodiment of the present invention an improvement is provided in the form of a method for providing a user interface with improved navigation features for an industrial control system comprising software objects for controlling and/or monitoring real world objects controlled by said control system, said system being arranged with a plurality of process graphics comprising one or more said software objects, which said method further includes displaying a main view comprising a first said process graphic in a window arranged with a designated view, the designated view being arranged with one or more tabs, wherein said method further comprises hiding a given designated view arranged with a tab on an operator display when one or more conditions are met.

According to an embodiment of the present invention an improvement is provided in the form of a method for providing a user interface with improved navigation features for an industrial control system comprising software objects for controlling and/or monitoring real world objects controlled by said control system, said system being arranged with a plurality of process graphics comprising one or more said software objects, which said method further includes displaying a main view comprising a first said process graphic in a window arranged with a designated view, the designated view being arranged with one or more tabs, wherein said method further comprises displaying context-sensitive information in a subtab view of the selected designated view.

This invention describes using a designated view for navigational purposes in an industrial control system. The designated view is normally placed alongside a process graphic view, and contains visual objects or graphic user interface (GUI) objects that act as links to other process graphics. The objects in the designated view will—when clicked—lead to a new process graphic being loaded into the process graphic view. The objects in the designated view can be aligned along one or more rows, and can have a variety of graphical appearances. The visual or GUI objects in the designated view can be tabs, buttons, ribbons, links, or other similar objects. For clarity, tabs will henceforth be used to signify any type of objects that can be used as links to other process graphics in the designated views.

Tabs are a set of visible graphic objects comprising one or more links to other process graphics. Tabs are normally placed aligned along (one or more) edges (in one or more rows/alignments) of a process graphic. However, the intended usage is not similar to the use of tabs in many other domains. In this invention, the tabs display links to some or all process graphics within a subgroup of the totality of process graphics. The invention relates to providing as a means of navigation between the process graphics in an industrial control system a view of a given process graphic arranged with a tab means to make active or select the given process graphic. The process graphic arranged in a view or pane or window with a tab is here called a designated view. The tabs of a designated view are used to navigate through process graphics that are predetermined as related by a process context of the industrial control system. This is in contrast to the traditional usage of tabs, where they are used to navigate between already-open windows.

Process graphics in a group of context-related process graphics that have been predetermined to be related by a technical context may be identified and linked at run time automatically using hierarchical structures of software objects in an industrial control system for control of an industrial process. The designated views so generated are used in the present invention for navigating or browsing dependent on a technical context. Tabbed browsing is a method of moving from one page of process graphics to another page by clicking on a tab of each window or pane, a process which may seem to be similar to the method of moving from one open window to another already-open window which has been used in office applications and web browsers. However, according to the invention predetermined groups including certain designated views which are arranged with tabs may be generated automatically by as a result of a manual or default or other selection process by then reading the hierarchical object structure in the control system software and grouping objects according to their level in the structure, or tree structure, so that tabs for process graphics that have a common technical context can be generated automatically.

Process graphics are the mainstay of most industrial control systems. All of the control objects are placed in a context of one or more process graphics. There are different ways to group these process graphics, preferably based on a logical structure and/or relationship(s) between them. For example a logical group may be a group of process graphics which monitor or control a set of related control functions. As an example, there can be a set of top-level graphics that act as overview graphics to the process graphics. One level down the process graphics that show the functionality for one area of this top-level are arranged. Subsequently, at a lower level than that, there are the detail graphics that show details for one or a few of the components in the process graphics.

In addition there can be other groupings of logically related process graphics, or operations related process graphics, such as shutdown matrices, fire & gas graphics or other functionally separated graphics for the top-level area. These different graphics could be grouped for example such that:

All top-level overview graphics are grouped together
All process graphics in one top-level area are grouped together
All detail graphics for one process graphic are grouped together
All shutdown matrices or other functional graphics are grouped together It is known to use a tab or tab view in general-purpose computer programs to navigate or switch between already-open windows, in programs such as web browsers, spreadsheets, programming tools. In contrast to navigation between already-open windows, configuration and interaction with navigation tabs according to the present invention gives the user the opportunity to easily see which navigational choices are available from the current location, and will display the process graphic linked to by the tab which is selected by the user. Which navigational choices that are made available to the user at any time is determined based on the currently displayed process graphic and which other process graphic or graphics are logically grouped in the same group as the currently displayed process graphic. This grouping may be based on a functional relationship, geographic relationship, or any other logical or useful characteristic in the control system. E.g. if a group is based on location, displaying a process graphic in area A would result in the tabs displaying some or all other process graphics in area A. If a group is based on a functional relationship such as e.g. heating system, distillation system, separation system, electrical system, etc—displaying a process graphic from the heating system would cause the tabs to contain links to some or all other process graphics in, for example, the heating system.

According to another aspect of the present invention, the tabs can be related to a system, a state of the system, a specific user task, different types of users and to accompany specific user preferences as recorded for example in user profile, user or needs. On a system level it is important to relate the grouping arranged with a navigation tab to an application of the system or a task that is to be performed. In many cases a process graphic, or an object representation in the process graphic may be directly linked to a control object or a configuration setting. It is also possible to implement the invention as workplace-tailored navigation arrangements specific to the application or task to be performed. In specific workplaces the tabs are used to be able to access the appropriate information for the application or task and easily switch between a plurality of appropriate displays, or designated views. For example these may be operations such as start up, operate, change operation, alarm handling tasks, specific process related tasks, maintenance tasks, active or past work orders, emergency actions, shut down and so on.

In addition, the user interface may also be arranged for adaptation according to user preferences, system state or current work tasks. The advantage of an adaptable or adaptive function is that it also supports active exploration into the system by the operators.

Embodiments of the invention may advantageously be used for control purposes in a control system of an oil or gas production, storage, treatment or process installation. Embodiments of the invention may also be used for control purposes in a control system for other industrial, manufacturing or process installations, such as in the pulp & paper, oil & gas, chemistry & life sciences, and transportation industries (such as railway control systems), and also used in an installation for generation, transmission or distribution of electrical energy. Such an installation may comprise thousands of unique devices or tag names. It is a great advantage that process graphics for technically related process views may be automatically accessed via a tab without requiring the related process views to be already loaded into a window for the tab to work. This would have otherwise imposed a very heavy demand on working memory and communication bandwidths in any control system.

The term a real world object is used in this description to describe a control object. The real world object may be an actual object such as a pump, a motor, a valve, etc., or a more abstract object such as a purchase order, production batch, etc. The present invention is not limited to traditional control or process control areas. Any real world object may be represented, as a tangible or intangible object which is controlled in a process, including a device or process, or a person carrying out a stage or role in a process, or intangible objects such as messages, a location, status of information etc.

Navigating between different process graphics, to or from different process displays, and to or from different detail displays is thus provided by one or more tabs displayed on each tab view. The navigation tabs provided by the invention may be likened to a set of simple signposts for navigating in an otherwise array of complex and hierarchical entities. The set of tabs may be generated automatically for manually predetermined or pre-programmed predetermined groups of related process graphics from the underlying software object architecture, the structures.

In a preferred embodiment of the methods of the invention one or more methods may be carried out by a computing device comprising one or more microprocessor units or computers. The control unit(s) or controller comprises memory means or a memory storage device for storing one or more computer programs for carrying out the improved methods. Preferably such computer program contains instructions for the processor to perform the method as mentioned above and described in more detail below.

BRIEF DESCRIPTION OF THE DRAWINGS

Embodiments of the invention will now be described, by way of example only, with particular reference to the accompanying drawings in which.

DETAILED DESCRIPTION OF THE EMBODIMENTS

This invention describes a system for and a method of providing navigation means in a user interface for an industrial control system for supervision, maintenance and control. The trend towards operation from remote operation centres has introduced an increase in both the control room operators' work domain and the workload as several different processes can be supervised and controlled in parallel.

Figure 1:
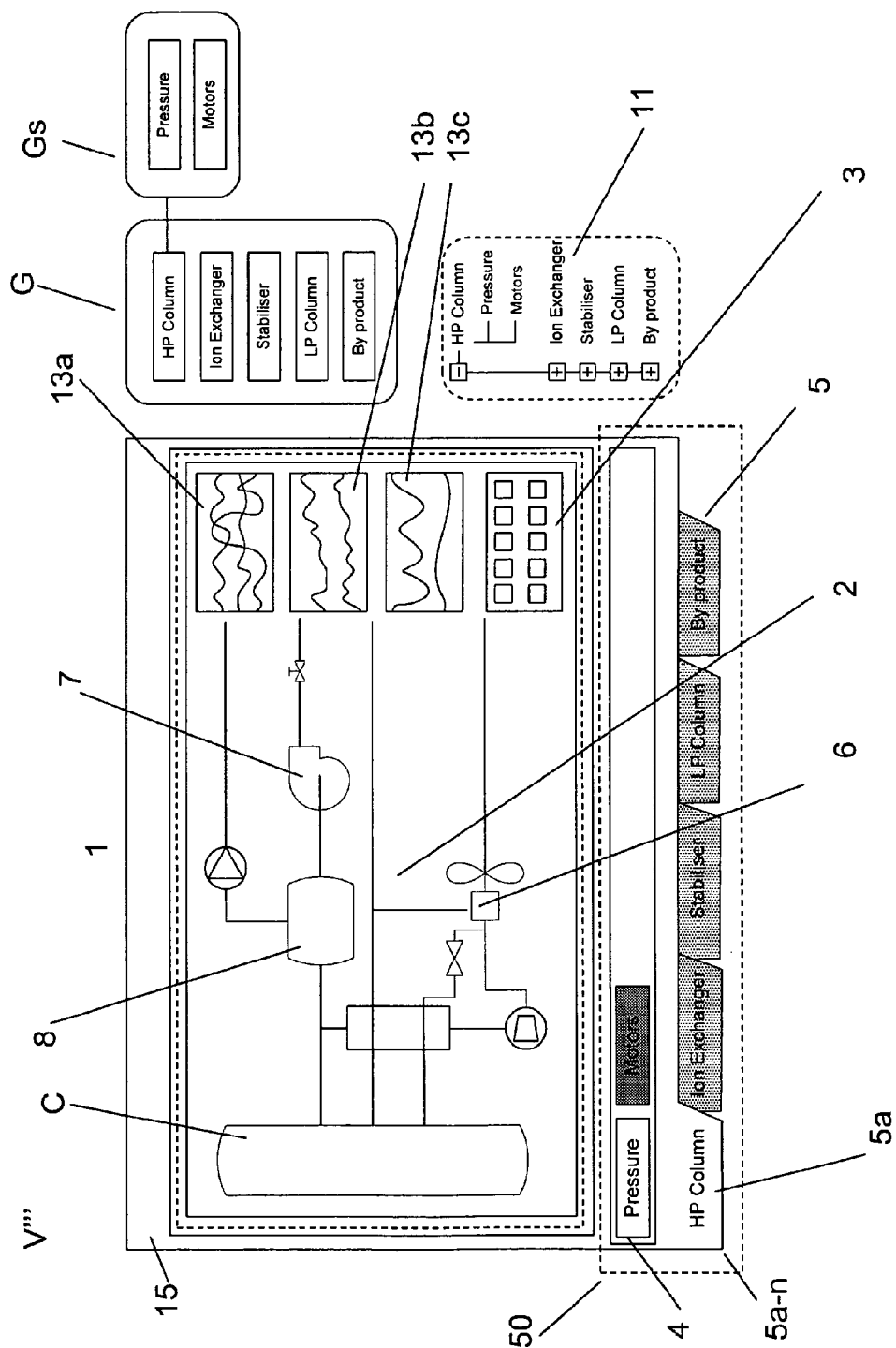
FIG. 1 is a schematic diagram for an improved user interface for carrying out a method in an industrial control system, and in particular wherein information is presented in a view arranged with one or more tabs according to an embodiment of the invention.

FIG. 1 shows an HMI interface 1, a user interface, with improved methods and means for navigation in a control system. The figure shows a process graphic 2 for part of a system displayed in a main view V'''. The type of view displayed includes a designated view according to one aspect of the invention, which designated view, as indicated by the rectangular box 50 shown with dashed lines. The designated view 5 comprises a first tab row 5 which tab row is accessed by a tab, in this case tab 5a. Tab 5a is shown blank and without shading in FIG. 1 to indicate that it is currently "selected" so that the process graphic 2 which is displayed by tab 5a is visible. Tab 5a is also marked with a name of a control object in the control system, in this case HP Column. Tab 5a is one of several tabs 5a-n arranged in the first tab row 5 of the designated view of main view V'''. The separate tabs 5a-n of a first tab row are shown arranged visible as they may be displayed on a display device 15 showing a display of a selected process graphic 2. Process graphic 2 is a member of a predetermined group G of process graphics. All the tabs available with a process detail view which belong to the same predetermined group G of process graphics are displayed in the tab row 5. The unselected tabs are indicated "unselected" in the figure as grayed or with a pattern (see also FIG. 4a-4b described below).

The process graphic 2 of FIG. 1 includes a number of visual objects or icons 6, 7, 8, each representing a function or aspect of a real world object, which real world object is controlled by software entities and software objects in the control system such as software objects 10, 11. FIG. 1 also includes a group G of process graphics which have been predetermined by a selection or configuration process to be linked by a common process context or relationship. Such a logical grouping as group G may be selected by a manual configuration or by a predetermined default, as the group to which one or more related process graphics belong. The figure shows icons or pictures representing eg two process vessels C, a high pressure column and 8, a buffer tank, a pump 7, a valve 6 in a view V''' of a process displayed by selecting by the tab 5a, which is also indicated as named Hp Column.

FIG. 1 also shows other graphical user interface control means such as navigation buttons at the bottom right of the display. This is shown as an area of buttons, or icons or other graphical representations in a panel 3 or in a ribbon, which provide direct access to frequently required areas, and/or functions, of the control system. For example as a button to access top level sub areas in plant, a button to click on to get to new tab view at a higher level in a structure, or a button to go to different parts of the plant. A sub panel or ribbon may also be used to select and display items such as process trends such as 13a, 13b, 13c, or to display items from process areas, other graphics, or detail graphics.

Figure 2:
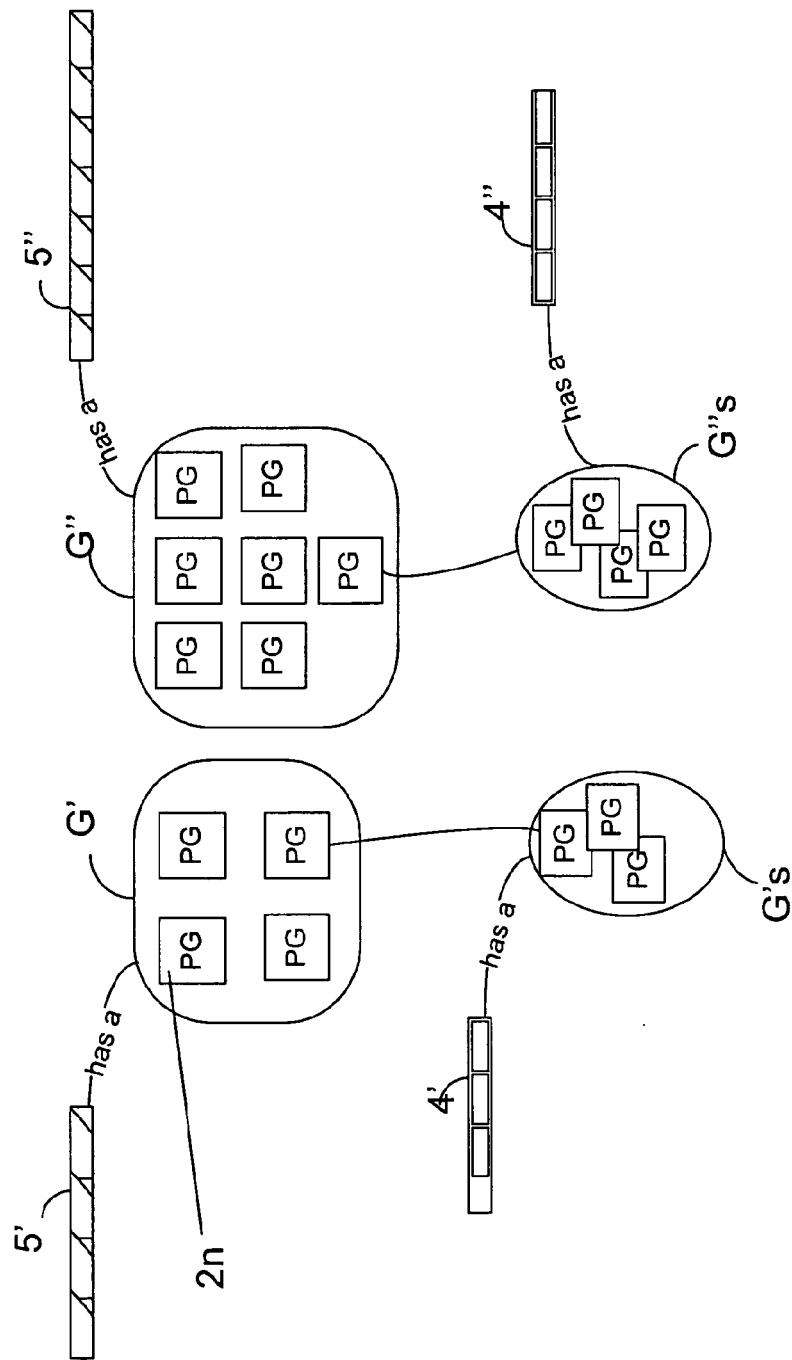
FIG. 2 is a block diagram showing a schematic arrangement of a group with a tab and a naming convention used in the method.

FIG. 2 shows in a schematic diagram four predetermined or logical groupings G arranged with process graphics PG and with designated views including tabs 5 or subtabs 4. The designated view shown comprises a first tab row 5 and a second tab row 4, as also shown in FIG. 1. In a logical or predetermined group 2n a number of process graphics PG are shown. Each process graphic PG is a member of a logical grouping or predetermined group G' or G" such that each predefined group may be arranged by means of a tab row 5', 5". Each of the tabs in the tab row is a link to one of the other process graphics within the same group. A process graphic of a first group G can also be related to another predefined group of process graphics Gs—such as a type of group called a subgroup. This subgroup G's or G"s can have a subtab view 4', 4" that displays subtabs to one or more of the process graphics within the subgroup.

Figure 3:
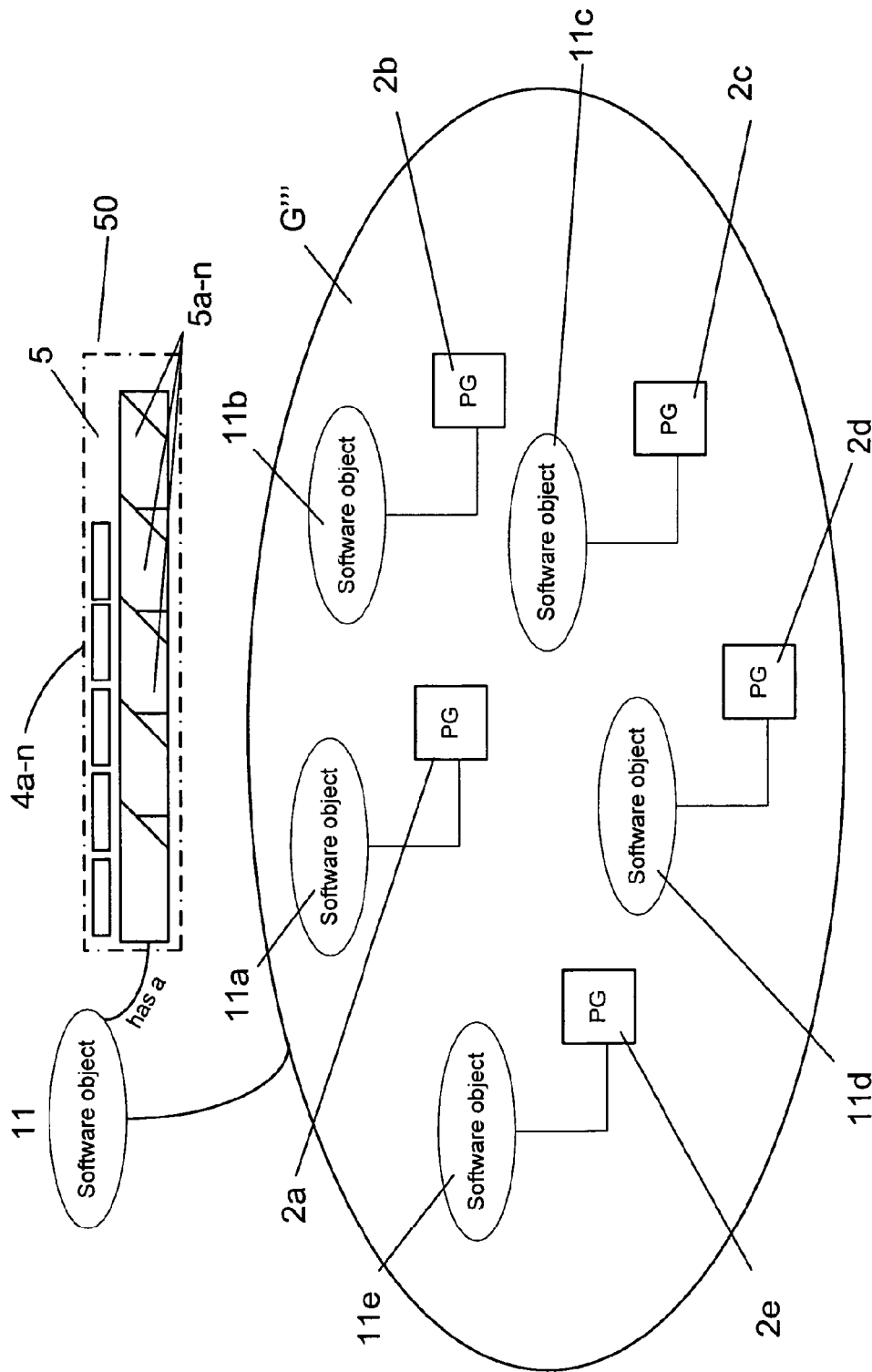
FIG. 3 is a block diagram showing a schematic arrangement of a group with a tab and a naming convention used in the method.

FIG. 3 shows a predetermined group G''' which is comprised as a software object 11. Software object 11 contains group G''' which in turn is arranged with a designated view 50 which is shown to comprise tabs 5a-n, and subtabs 4a-n. Group G''' is shown to include 5 process graphics, 2a-e, each of which may also be arranged with a software object. This is a schematic diagram intended to show how process graphics are related to software objects, and how one or more other software objects may be used to represent a logical or predefined group of software objects and process graphics such as G'''. The group software object 11 holds a designated view 50 (which in this case includes a tab view and a subtab row view 4) that contains links to all process graphics (2a-e) within the predefined group it represents.

Figure 4A:
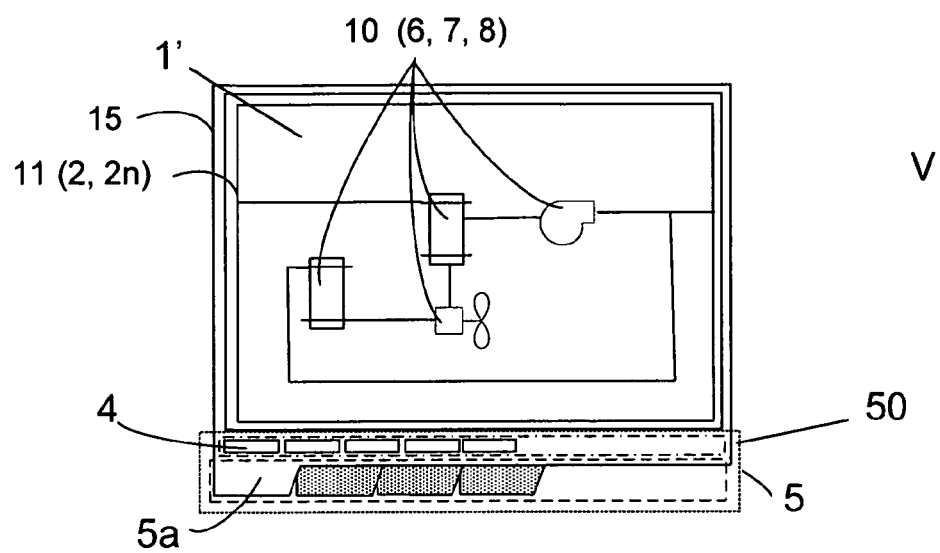
FIG. 4a is a schematic diagram of a display for carrying out a method in an industrial control system, and in particular including one or more tabs and arrangement of tabs according to an embodiment of the invention.

FIG. 4a shows a user interface with a main view V displaying a process graphic 1' displayed on a display device 15. Main view V also has a designated view, inside the rectangle 50 shown with dashed lines, with a tab row 5 and tabs including a tab 5a which is indicated as blank to show that it is selected. In the designated view of main view V a second tab row 4 is included and shown with five sub tabs. On the display a software object 11 generates the process graphic 2, 2n. On the process graphic four icons are displayed that represent other software objects 10. The four icons are also indicated in FIG. 1.

Figure 4B:
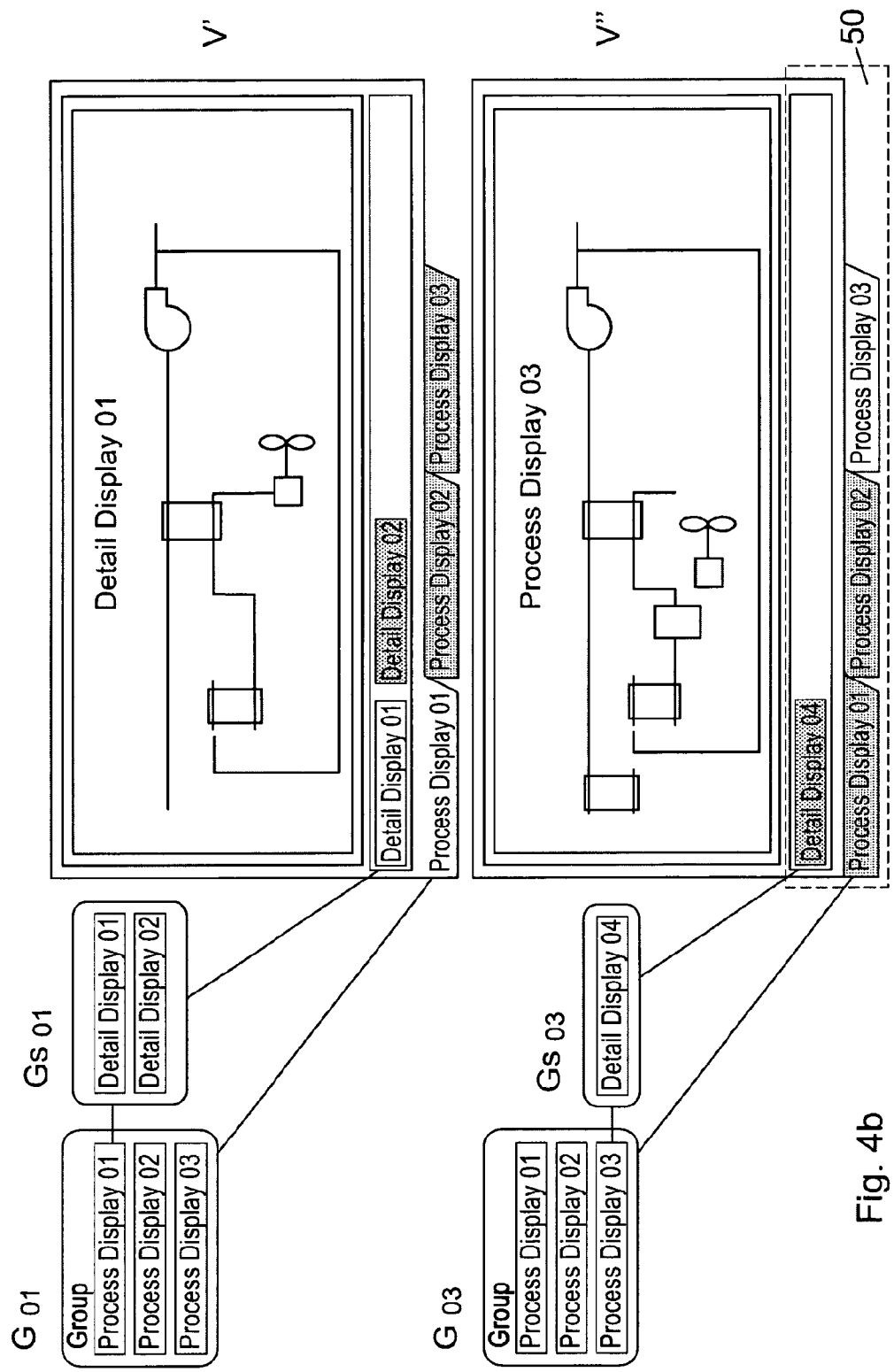
FIG. 4b is a schematic diagram of a display for carrying out a method in an industrial control system according to an embodiment of the invention, and in particular showing further displays reachable by navigating with one or more tabs.

FIG. 4b shows two main views V', V" each provided with designated view including a tab row and, in this case, a sub tab view. In view V' a process graphic Detail display 01 is shown and this is accessed by means of a subtab $Gs_{01}$ which is a sub group of $G_{01}$. Thus Detail Display 01 is reached by selecting that sub tab from the tab marked Process Display 01 which is a tab in group $G_{01}$. Similarly as shown in main view V''' Process Display 03 is shown, which is a member of a group G03, and which also has one subtab marked as Detail Display 04.

Figure 5:
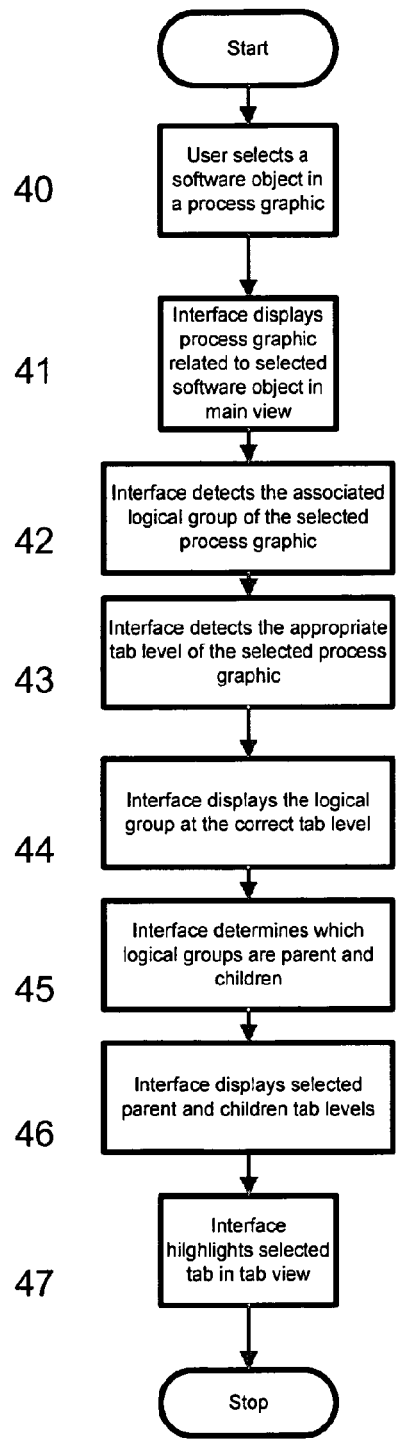
FIG. 5 is a flowchart for a method to display a user interface for an industrial control system according to an embodiment of the invention, and in particular by means of selecting on a display means a visual object in a view provided according to an embodiment of the invention.
Figure 6:
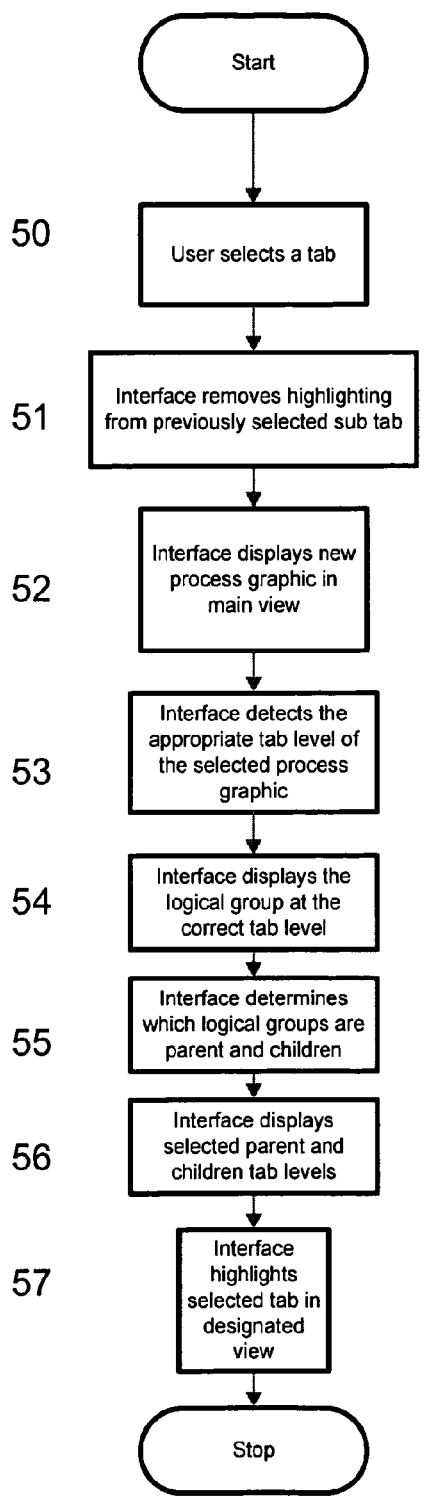
FIG. 6 is a flowchart for a method to display a user interface for an industrial control system by selecting a tab on a display means arranged in a display relative to a view provided by according to an embodiment of the invention.

FIG. 5 shows a flowchart for a method for the user initiating a navigation to a new process graphic by selecting a software object in another process graphic or a previous process graphic:

40. User selects a software object in a process graphic; eg by clicking on an icon or other visual object,
41. Interface displays process graphic related to selected software object in the main view;
42. Interface detects the predetermined group of the selected process graphic;
43. Interface detects the predetermined tab level of the selected process graphic;
44. Interface displays the logical group at the correct tab level;
45. Interface determines which logical groups are parent and children;
46. Interface displays selected parent and children tab levels; ie tabs for all available process detail views are displayed,
47. Interface highlights selected tab in designated view;

FIG. 6 shows a flowchart for a method for navigating in a complex system, accessing a desired view of eg a process graphic which is a member in a logical predetermined group of process graphics, namely by selecting a tab, such as tab 5a in FIGS. 1, 2, 3*a-b:*

50. User selects a tab;
51. Interface removes highlighting from previously selected subtab, if any;
52. Interface displays new process graphic in main view;
53. Interface detects the appropriate tab level of the selected process graphic;
54. Interface displays the logical group at the correct tab level;
55. Interface determines which logical groups are parent and children;
56. Interface displays selected parent and children tab levels;
57. Interface highlights selected tab in tab view.

Figure 7:
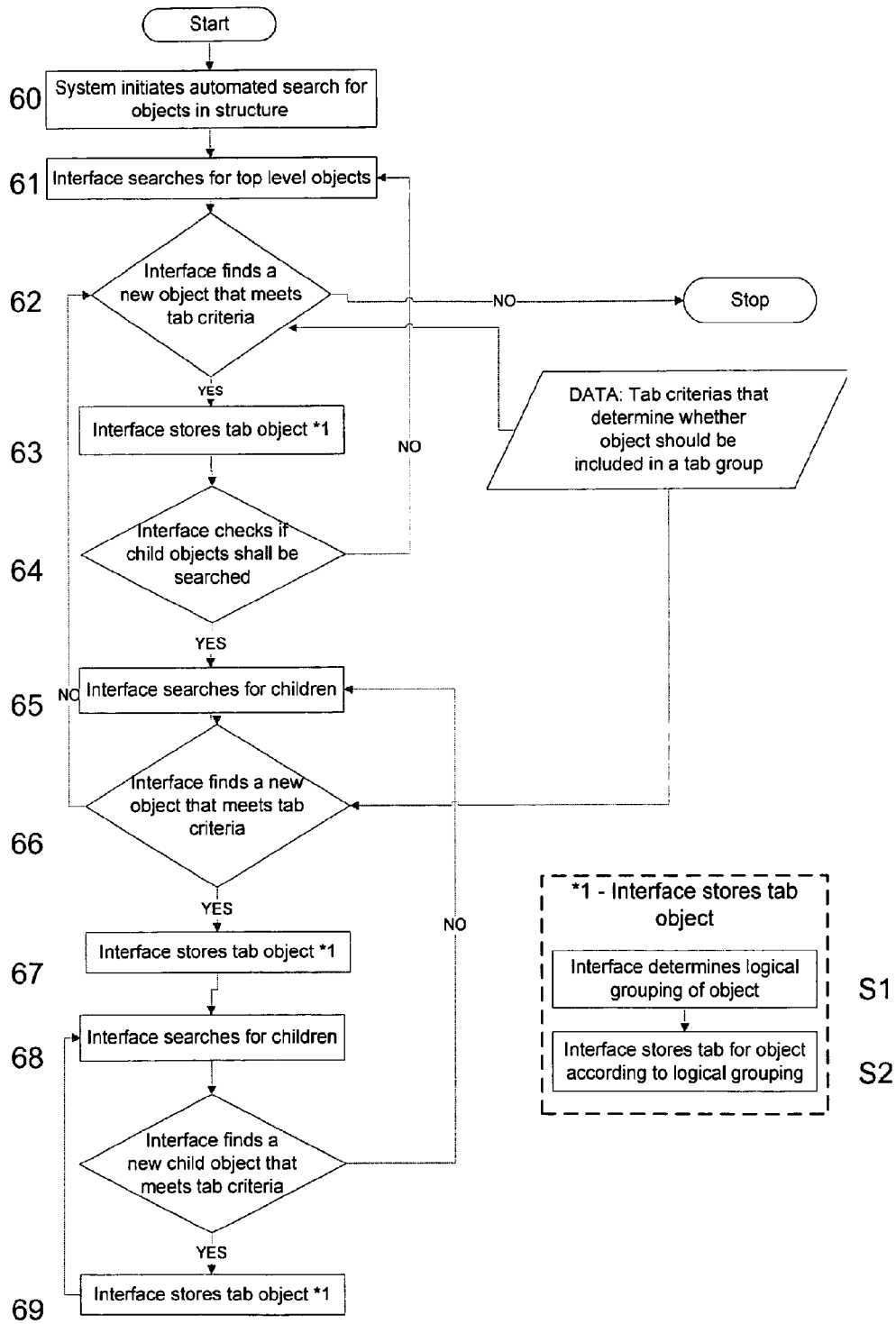
FIG. 7 is a flowchart for a method to configure an industrial control system for a user interface such that the user interface is for carrying out a method in an industrial control system according to an embodiment of the invention, and in particular when the user interface is subsequently displayed after configuration, comprises one or more tabs for switching between views according to an embodiment of the invention.

FIG. 7 shows a configuration method that establishes which objects of a predetermined group of process graphics shall be configured to be displayed in a view arranged with a tab. The method comprises at least the steps of:

60. System initiates an automated search for objects in a structure;
61. Interface searches for top level objects;
62. Interface finds a new object that meets tab criteria, results in either No, then Stop, or Yes then
63. Interface stores tab object *1,
64. Interface checks if child object shall be searched, if No the the Interface stops or goes back to step 61;
65. if yes then Interface searches for children, then
66. reiterates in effect steps 62, 63 and on finding a new (child) object that meets tab criteria
67. stores tab object *1; then
68. reiterates in effect steps 62, 63 and on finding a new (child) object that meets tab criteria
69. stores tab object *1;

until each new object, and any child object of it, has been found and stored as a tab object *1 where
storing the tab object *1 may comprise steps such as
  interface determines a logical grouping of an object, and
  interface stores tab for the object according to the logical grouping.

When evaluating a new object the Interface may access DATA to obtain criteria which may be used to determine whether an object should be included in a logical grouping of a tab or not. The tabs are not refreshed during normal operation, and so new objects are only searched for and added during commissioning, or during maintenance etc., with the option updating following a manual request. Thus as shown in FIG. 7 tabs may also be generated automatically and depending on the position of objects in a hierarchical structure of a control system.

Figure 8:
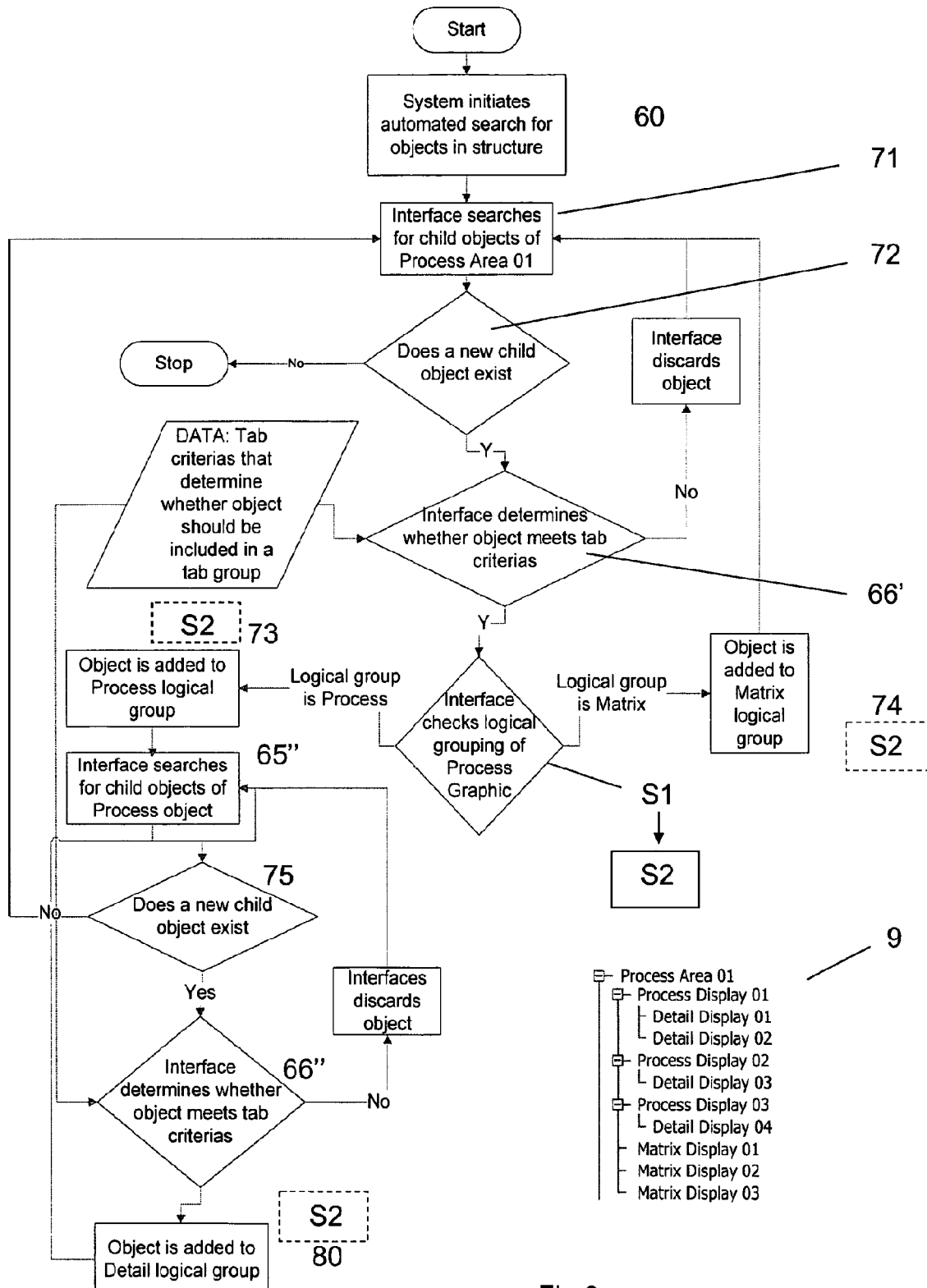
FIG. 8 is a flowchart demonstrating an example for a method to configure an industrial control system for a user interface such that the user interface is for carrying out a method in an industrial control system according to an embodiment of the invention, and in particular for configuring a process area to be arranged with views each comprising one or more tabs.

FIG. 8 shows a flowchart of an example of an application of the method for configuring tabs and tab fields. FIG. 8 includes a diagram of a structure 9 for a Process Area 01 which comprises a number of child objects which are software objects Process Display 01, Process Display 02, Process Display 03, Matrix Display 01, Matrix Display 02, Matrix Display 03. Process Display 01 has two child objects, Detail Display 01 and Detail Display 02. Process Display 02 has one child object, Detail Display 03, as has Process Display 03 which has child object Detail Display 04.

In an application of the basic engineering method, configuration method of FIG. 8 the following steps occur:

60. System initiates an automated search for objects in a structure; as in FIG. 6,
71. Interface searches for child objects of a software object, Process Area 01,
72. Decision made for Does a new child object exist;
66'. If yes, Does it meet tab criteria (from DATA);
S1. If yes the Interface checks logical grouping of process graphic and
72. adds to Process Logical group or
73. adds to Matrix logical group and
S2. stores the tab object according to its logical grouping; may be stored S2 in some way associated with the logical grouping established in 72 or 73,
65' Interfaces searches for child objects of the Process Object, eg Process Display 01,
75. Decision for does a new child object exist (of Detail Display 01);
66'. If yes, does it meet tab criteria (from DATA);
80. If yes, then added to a Detail logical group, a logical group that is identified dependent on position of an object such as Detail Display 01 or 02 in the structure 9.

Step 60 is so numbered because it is essentially the same step as 60 of FIG. 6; likewise step 66' and 66" is like step 66 of FIG. 6 which in effect reiterated steps 62,63 on finding a new (child) object and checking tab criteria; and step 65', searching for a new child object, is essentially the same as 65 of FIG. 6. The tabs may be stored S2 after determining which logical group they belong to, and optionally tab objects for each logical grouping may be stored separately in some way, as indicated by the S2 blocks shown with a dotted line for each logical grouping.

The software object such as 10 or 11 of FIG. 4a can be placed in several different structures at the same time in a control system, where the different structures represent different relations, e.g. functional and physical containment. Thus relations may be such as functional structure eg electrical system, process section, piping layout; and location structure may be a building location, area location, room location, which storey or level, and so on. The same pump or filter may be represented in a process diagram, a location in a plant by building, floor, and area etc as well as in an electrical diagram, a detail process diagram, a process piping diagram and so on, which may be in a similar way as the structures described in WO01/02953 or US-2002-0046290-A1, of which the latter is hereby incorporated in this specification in its entirety by means of this reference.

The tabs can also show more information than just the graphic it links to. For example it may be arranged to display dynamic information such as information about how many top-level alarms are active in the graphic currently displayed by selecting the present tab. The tabs can also be configured based on the user or the user's role, workstation or other personalization criteria. Certain of the tabs can be visualized with distinguishing factors based on type or level. It is important that different functional information on a display may be quickly identified according to its purpose by an operator, and with a minimum of effort. This ease of identification is particular important for the operator to find the most relevant information during an alarm or emergency situation. Functionally appropriate and task or operator adapted displays are also important to reduce unnecessary effort which may lead to operator fatigue. For example, top-level tabs have one visual appearance, or look & feel, and detail graphics have another. Such a configuration can conveniently be stored as a xml-file or other structured text format.

The tabs can be implemented for example as one object on the top-level, or one object for each of the functional areas. The tabs can also be arranged into a separate panel, so the tabs do not need to be included in all process graphics. The tab configuration can also include filtering to only include objects relevant to an operator interface.

As described above tab configuration can be configured or engineered to relate to logical groupings related to one or more functions, such as working tasks, system status, information types and user preferences. This may be done on a one-off basis during initial engineering or set-up of a system, or carried out at a later stage during a system update, or both. There are at least two basic ways to relate presentation objects in a tabbed view. The tab view can either be predefined to include a set of objects or configured based on properties of the presentation objects. These two approaches are not exclusive and a single object can relate to both predefined tabs and to a local tab for a group of presentation objects used in a single presentation. Predefined tabs may relate to work tasks, system states, user preferences or information types. Local tabs may for example may be groups of default, or manually configured, determinations that relate to system states, user preferences and information types.

The grouping of these information objects can be done according to many different criteria. Examples for such a predetermined group of information objects related to a series of process graphics might be to make or configure groups of objects according to presentation mode (e.g. textual, graphical, auditory, visual), data type (current/historic, analog/digital), functional aspects (electrical, process, cooling system, fire & gas, etc) or other logical relationships.

In performing different tasks and in the supervision of different process states, the operator will have different requirements for information. That means that the information presented needs to be context sensitive. An example of a state of a process that creates specific information needs and increased workload for the operator is start-up and shutdown of the plant. Such information may be arranged as one or more Matrix displays subtab views, see for example structure 9 in FIG. 8.

The improved navigation in a control system provided by this invention may also be arranged to use the structures of objects in a software architecture of a control system, such as the control system supplied by ABB called 800xA, to generate tabs for browsing or navigating in a complex hierarchical system. The tabs may be configured semi-automatically. The predetermined group of process graphics may be configured, for example by a default setting, and/or by a manually operated selection. By automatically reading a hierarchical object structure of a process graphic that has been configured, manually selected or selected as a default, objects may be logically grouped relative to a function in the control system and according to their level in a tree structure, and the tabs can be generated automatically. There are different ways to group these process graphics in a view selected by a tab, based on a process context and the logical structure and/or relationships between them.

In a preferred embodiment the visual objects or graphic elements or other objects that make up the desired process graphic of interest in a main view which are displayed by selecting a "new" tab are only loaded into memory on selection of the tab for the first time in a user session, so that the system resources consumed by these methods are minimal. The data for the objects or elements making up a process graphic may, dependent on preferences and use of resources, be retained in memory during a session after it has been loaded for a first time but no longer being actively displayed in an open window.

In another embodiment, each process graphic of each designated view linked to a currently open designated view may be loaded into memory before a tab is selected but according to a predetermined priority. For example using FIG. 3 to explain a possible priority, begin with opening and loading into from memory FIG. 4b the lower designated view V'''. The process graphic and all other objects in of V''' are loaded. When the view V''' and all the objects shown for the currently selected designated view of the tab labelled Process Display 03 have loaded, then some or all of the objects in each of the designated views linked with tabs labelled Process Display 01 and Process Display shown in view V''' may be preloaded into memory, even before any of the designated views have been selected.

According to a development of the invention, more than one array of tabs may be grouped according to a logical place in a parent-child hierarchy for a software object. Thus in FIG. 4a a display device 2 schematically displays an interface 1' on a main view part of a graphical display. On a secondary part of the graphical display a designated view 50 includes a tab row 5 is shown including four tabs, of which one is blank to indicate that it is currently selected, and three tabs shown with a pattern (grayed) to indicate not-selected or inactive. In addition, a second row of five tabs, subtabs 4 are shown on the display. The subtabs provide access to process graphics present which are logically related the selected tab (which selected tab represents a given process graphic from a higher level in the structure). In terms of the example process detail graphics such as Detail Display 01 and Detail Display 02 associated with Process Display 01 may be accessed by the sub tabs 4 on the subtab view. Thus selecting tab 5a of FIG. 4a results in loading and displaying the corresponding process graphic in the view V, and the loading and displaying of the subtabs 4 in the view V. Likewise the selection in FIG. 4b of subtab Detail Display 01 in view V' has loaded and displayed the Detail Display 01 process graphic in the view V'.

FIG. 4b illustrates the displays generated from a structure 9, in more detail. The upper view shows how the displays are provided for Process Display 01 and its child objects. The tab 5 for Process display 01 has two subtabs 4 associated with it, Detail Display 01 and Detail Display 02. This relationship is automatically constructed from the structure, and may be seen in the structure that software object Process Display 01 has two child objects Detail Display 01 and 02. In the example view shown in FIG. 4b upper, Detail Display 01 is shown selected and the tab to access Detail Display 02 is grayed. The second, lower, view also reflects the structure diagram. It shows a Process Display 03 which has one associated subtab only, which is Detail Display 04. Thus the user can switch via a tab between Process Display 04 and its associated child object, Detail Display 04.

Tabs may be predetermined or pre-configured according to different control operations or work processes carried out in a plant. Maintenance personnel, for example, need specific information in order to plan maintenance, such as run-time measurements, vibration measurements, maintenance alerts/alarms, active or past work orders connected to the equipment etc. Specific tabs with maintenance information can be made available to maintenance personnel, allowing him or her to work in the same system as the control room operators but with different information presented or the same type of information presented but grouped in different ways depending on a maintenance etc function or task.

The invention relates to systems that are used by operators in control rooms today, but may also be very relevant for new types of control room interfaces. Current control room interfaces are normally based on desktop computers with one or more desktop monitors and/or one or more large screens. The concept could be used in such a setting, but it could also be used for mobile interaction devices such as tablet-pc's, mobile phones, electronic paper, virtual or augmented reality systems, PDAs, multi-modal interfaces, etc.

The method can be used on any system for process information visualization that is used to present groups of information that can be of varying relevance to the operator depending on the current context. The process visualization system can for example be P&ID based graphics, abstraction hierarchies, model-based representations, 3D visualizations or abstract visualizations of process information. A description of a 3D representation of an industrial process arranged in conjunction with a control system is described in application U.S. 60/6677,080, which specification is hereby included in its entirety by means of this reference.

As described in reference to a preceding embodiment, the tab of a main view V, V', V" comprising a designated view with one or more tabs may be automatically generated based on a hierarchical object relationship and used to navigate to one or more parts of the control system. The tabs thus represent improved navigation opportunities for the operator, so clicking on a tab will take the operator to a different location in the control system. In this embodiment, the tabs are thus mainly a means for navigating between process graphics. This to be understood to be in stark contrast to the concept of using tabs for moving between currently-open windows, a function which is applied in spreadsheet programs and web browsers.

In an international application WO2006103541A1 entitled Method and system for providing a user interface, hereby incorporated in full in this specification by means of this reference, it is described that information is presented at least in part displayed in layers or filters on one or more display screens of a control system; and that the content for the layers, which also provide an interface to a process state or function, is determined based on information available from said control system, dependent on which of the available items of said information shall be visually displayed or otherwise presented prominently, or displayed less prominently, or hidden.

In a development of a further embodiment of the present invention the feature of displaying process information distributed between layers is combined with the feature of designated views arranged with a tab. Thus for example during a particular operation, for example an optimization task, the layer function may used to select that a layer of the process graphic shall be visible or not visible. Thus a layer comprising a process flow function or a process control function or a location schema may on selection be switched display visible or not visible by means of layers. This may be arranged for different functions, configuration, maintenance, optimization or for different operations, for example start up, trouble shooting, change of operation state and so on.

Methods of the invention may be supervised, controlled or carried out by one or more computer programs. One or more microprocessors (or processors or computers) comprise a central processing unit CPU connected to or comprised in one or more of the above described control units, which processors, PLCs or computers perform the steps of the methods according to one or more aspects of the invention, as described for example for operating or controlling a system as described with reference to FIGS. 7, 8. It is to be understood that the computer programs for carrying out methods according to the invention may also be run on one or more general purpose industrial microprocessors or PLCs or computers instead of one or more specially adapted computers or processors.

The computer program comprises computer program code elements or software code portions that make the computer or processor perform the methods using equations, algorithms, data, stored values, calculations, synchronisations and the like for the methods previously described, and for example in relation to the flowcharts of FIGS. 7, 8, and/or to the graphic user interfaces of FIGS. 1, 4a, 4b. A part of the program may be stored in a processor as above, but also in a ROM, RAM, PROM, EPROM or EEPROM chip or similar memory means. The or some of the programs in part or in whole may also be stored locally (or centrally) on, or in, a memory storage device of a control system, and/or on suitable computer readable medium such as a magnetic disk, CD-ROM or DVD disk, hard disk, magneto-optical memory storage means, in volatile memory, in flash memory, as firmware, or stored on a data server. Other known and suitable media, including removable memory media, a USB memory stick and other removable flash memories, hard drives etc. may also be used. The program may also in part be supplied or updated from a data network, including a public network such as the Internet.

It should be noted that while the above describes exemplifying embodiments of the invention, there are several variations and modifications which may be made to the disclosed solution without departing from the scope of the present invention as defined in the appended claims.

The invention claimed is:

1. An industrial control system comprising:
a processor, a memory and a display device, wherein the memory comprises computer program instructions configured to present a graphical user interface using the display, the graphical user interface comprising a plurality of process graphics comprising one or more software objects for controlling and/or monitoring real world objects controlled by said control system, arranged such that elements of one or more of the software objects or part thereof are displayed on an interface displayed on said display device, the graphical user interface comprising a main view comprising a first said process graphic in a window, which first said process graphic is a member of a predetermined group of process graphics, the main view comprising a designated view comprising one or more tabs directly linked to other members of the predetermined group in said industrial control system, such that selecting one of the tabs on a designated view of a main view with a process graphic allows the user to navigate to one of the predetermined group of process graphics, the user interface further comprising computer hardware and software elements configured to receive input to select a tab arranged on at least one designated view.

2. The industrial control system according to claim 1, wherein the user interface comprises computer hardware and software elements for loading a new process graphic into the main view of the selected tab.

3. The industrial control system according to claim 1, wherein the user interface comprises computer hardware and software elements for automatically displaying one or more selected tabs dependent on said process graphic displayed on the interface and a predetermined logical or common process context link between one or more process graphics.

4. The industrial control system according to claim 1, wherein the user interface comprises computer hardware and software elements for automatically displaying, on a tab comprising a static reference to a process graphic, a dynamic information display or a dynamic value.

5. The industrial control system according to claim 1, further comprising:
computer program instructions for automatically comparing any new objects found in a designated view with criteria and determining a logical grouping of a new object.

6. The industrial control system according to claim 1, further comprising:
computer program instructions for automatically determining a logical grouping of a new object and storing tab information for the new object according to the logical grouping so determined.

7. The industrial control system according to claim 1, further comprising:
computer program instructions for automatically displaying one or more selected tabs dependent on a task for an operator, the task comprising any from the group of: start up, operate, change operation, alarm handling tasks, specific process related tasks, maintenance, shut down.

8. The industrial control system according to claim 1, further comprising:
computer program instructions for automatically displaying one or more selected tabs which are displayed dependent on a status of a process controlled by said control system, the status comprising any from the group of: start, run, process change, event, alarm, stop, offline, configuration or maintenance, simulation.

9. The industrial control system according to claim 1, further comprising:
computer program instructions for automatically displaying one or more selected tabs which are displayed dependent on a status of a process controlled by said control system, the status comprising any from the group of: start, run, process change, event, alarm, stop, offline, configuration or maintenance, simulation.

10. The industrial control system according to claim 1, wherein the user interface comprises computer hardware and software elements for highlighting a tab in the designated view based on which said process graphic is currently displayed in the interface.

11. The industrial control system according to claim 10, wherein the user interface comprises display elements configured to automatically display on a tab a dynamic value for the number of active alarms for a process section.

12. A computer and a display device comprised in an industrial control system, which system further comprises a plurality of process graphics comprising at least one software object for controlling and/or monitoring real world objects controlled by said control system, arranged such that elements of at least a portion of at least one of the software objects are displayed on an interface displayed on said display device, said user interface comprising elements configured to generate and display in a graphical user interface a main view comprising a first said process graphic in a window comprising a designated view, the designated view comprising at least one tab, wherein first said process graphic is a member of a predetermined group of process graphics, wherein the tabs are directly linked to other members of the predetermined group of process objects, such that selecting one of the at least one tab on the designated view of a process graphic allows the user to navigate to one of the predetermined group of process graphics, the computer and display device further comprising computer elements or user interface elements configured to receive input to select a tab arranged on at least one designated view.

13. The computer and display device according to claim 12, further comprising:
computer elements or user interface elements configured to determine selection of the designated view by the input to the tab.

14. The computer and display device according to claim 12, wherein the user interface comprises computer hardware and software elements for automatically displaying, on a tab comprising a static reference to a process graphic, a dynamic information display or a dynamic value.

15. The computer and display device according to claim 12, wherein the user interface comprises display elements configured to automatically display on a tab a dynamic value for the number of active alarms for a process section.

16. The computer and display device according to claim 12, further comprising:
computer program instructions for automatically comparing any new objects found in a designated view with criteria and determining a logical grouping of a new object.

17. The computer and display device according to claim 12, further comprising:
computer program instructions for automatically determining a logical grouping of a new object and storing tab information for the new object according to the logical grouping so determined.

18. The computer and display device according to claim 12, further comprising:
computer program instructions for automatically displaying at least one selected tab dependent on a task for an operator, the task comprising any from the group of: start up, operate, change operation, alarm handling tasks, specific process related tasks, maintenance, shut down.

19. The computer and display device according to claim 12, further comprised as any from the group of a: desktop computer including at least one desktop monitor and/or at least one large screen, a tablet computer, a mobile phone, electronic paper, a virtual or augmented reality system, a PDA, or a multi-modal interface.

* * * * *